US 8,488,878 B2

United States Patent
Yuan et al.

(10) Patent No.: US 8,488,878 B2
(45) Date of Patent: Jul. 16, 2013

(54) SKY DETECTION SYSTEM USED IN IMAGE EXTRACTION DEVICE AND METHOD USING SKY DETECTION SYSTEM

(75) Inventors: Xun Yuan, Beijing (CN); Tao Li, Beijing (CN); Gang Wang, Beijing (CN); Zhongchao Shi, Beijing (CN)

(73) Assignee: Ricoh Company, Limited, Tokyo (JP)

( * ) Notice: Subject to any disclaimer, the term of this patent is extended or adjusted under 35 U.S.C. 154(b) by 531 days.

(21) Appl. No.: 12/801,322

(22) Filed: Jun. 3, 2010

(65) Prior Publication Data

US 2010/0322510 A1  Dec. 23, 2010

(30) Foreign Application Priority Data

Jun. 19, 2009  (CN) .......................... 2009 1 0147779

(51) Int. Cl.
  *G06K 9/00*  (2006.01)
(52) U.S. Cl.
  USPC .......................... 382/165; 382/164; 382/173
(58) Field of Classification Search
  USPC .......................... 382/165, 16, 173
  See application file for complete search history.

(56) References Cited

U.S. PATENT DOCUMENTS

| | | | |
|---|---|---|---|
| 6,504,951 B1 * | 1/2003 | Luo et al. ...................... | 382/165 |
| 2003/0001958 A1 * | 1/2003 | Hoshuyama ............... | 348/223.1 |
| 2003/0053686 A1 * | 3/2003 | Luo et al. ..................... | 382/165 |
| 2005/0147298 A1 * | 7/2005 | Gallagher et al. ............ | 382/173 |
| 2005/0224074 A1 * | 10/2005 | Steneby ........................ | 126/698 |
| 2005/0226522 A1 * | 10/2005 | Gallagher ..................... | 382/254 |
| 2006/0013478 A1 * | 1/2006 | Ito et al. ......................... | 382/167 |
| 2008/0089557 A1 * | 4/2008 | Iwaki et al. ................... | 382/106 |
| 2008/0218603 A1 * | 9/2008 | Oishi ........................ | 348/231.99 |
| 2010/0085440 A1 * | 4/2010 | Fujita et al. ................ | 348/222.1 |
| 2010/0284614 A1 * | 11/2010 | Xu et al. ....................... | 382/167 |
| 2010/0322513 A1 * | 12/2010 | Xu et al. ....................... | 382/167 |

OTHER PUBLICATIONS

Jiebo Luo et al, "A Physical Model-Based Approach to Detecting Sky in Photographic Images" IEEE Transactions on Image Processing, vol. 11, No. 3, Mar. 2002, pp. 201-212.

* cited by examiner

*Primary Examiner* — Jingge Wu
(74) *Attorney, Agent, or Firm* — Harness, Dickey & Pierce, P.L.C.

(57) ABSTRACT

Disclosed is a sky detection system that detects sky in an image collection device. The system includes an image collection unit that collects information of a color image; a color-feature extraction unit that extracts a color feature of each pixel from the collected image; a distance measurement unit that measures a distance between each pixel of the collected image and a lens; a first classification unit that classifies each pixel of the collected image as either a sky pixel or a non-sky pixel based on the color feature; and a second classification unit that further classifies each pixel of the collected image as either the sky pixel or the non-sky pixel based on the distance and a result of the first classification unit.

12 Claims, 15 Drawing Sheets

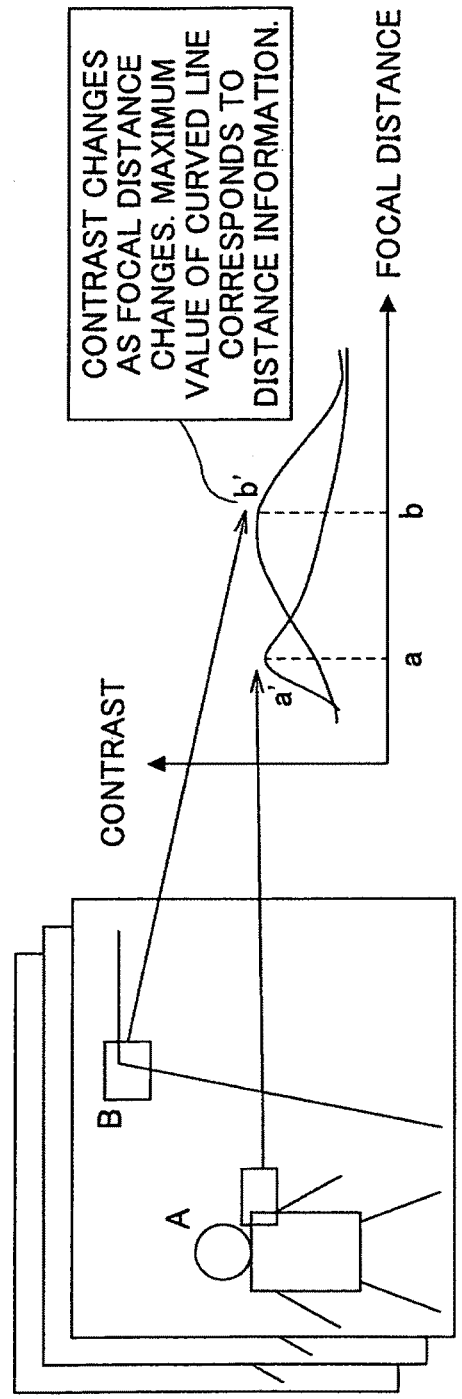

FIG.5B

| | | | | | | | | | | | | | | | |
|---|---|---|---|---|---|---|---|---|---|---|---|---|---|---|---|
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | INF | INF | INF | INF | INF | INF | INF |
| INF | INF | INF | INF | INF | INF | INF | INF | INF | 1610 | 1763 | 1194 | 1481 | 1763 | 1763 | 1763 |
| 1949 | 1949 | 1949 | 1949 | 1949 | 5263 | 1194 | 1610 | 1763 | 1610 | 1610 | 1194 | 1610 | 1763 | 1194 | 1763 |
| 1949 | 1949 | 1949 | 4273 | 1949 | 5263 | 1194 | 1610 | 1763 | 1763 | 1610 | 1194 | 1610 | 1763 | 1610 | 1763 |
| 1949 | 1949 | 4273 | 1949 | 4273 | 5263 | 1277 | 1122 | 1763 | 1763 | 1610 | 1194 | 1610 | 1763 | 1610 | 2695 |
| 1949 | 1949 | 1949 | 4273 | 1949 | 1949 | 1277 | 1763 | 1058 | 1763 | 1122 | 1277 | 1122 | 1763 | 1122 | 1949 |
| 1949 | 1949 | 5263 | 1949 | 5263 | 1949 | 14285 | 1763 | 1763 | 1763 | 1763 | 1763 | 1763 | 1763 | 1763 | 1949 |

FIG.11

Step 1: n × n matrix M is formed and initialized as M(i, j)=0(i=1...n, j=1...n). n × n matrix B is formed, and matrix B(i, j) is initialized as 0,1 based on sky detection result by second classification unit.
Step 2: stack S is formed and initialized as empty stack.
Step 3: x=0, y=0, C=0.
Step 4: if M(x, y)=0,
 step 4.1: C=C+1, M(x, y)=C.
 step 4.2: S.push(x, y).
 step 4.3: if S is empty, go to step 5;else(x0, y0)=S.pop().
 step 4.4: For pixel B (x0, y0) corresponding to M(x0, y0) and its eight neighboring pixels B (xi, yi), (i=1...8)
  step 4.4.1: if M(xi, yi)!=0, go to step 4.5
  step 4.4.2: if B(x0, y0) equals to B(xi, yi), then: M(xi, yi)=C; S.push(xi, yi).
 step 4.5: go to step 4.3.
Step 5: C=C+1
Step 6: x=x+1.
Step 7: if x>=n: x=0, y=y+1.
Step 8: if y>=n, exit; else go to step 4.

FIG.12A

| 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 0 | 0 | 0 | 0 | 0 |
| 1 | 1 | 1 | 1 | 1 | 1 | 1 | 1 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

FIG.12B

| 1 | 1 | 1 | 1 | 1 | 1 | 1 | 1 | 1 | 1 | 1 | 1 | 1 | 1 | 1 |
|---|---|---|---|---|---|---|---|---|---|---|---|---|---|---|
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 1 | 1 | 1 | 1 | 1 |
| 1 | 1 | 1 | 1 | 1 | 1 | 1 | 1 | 1 | 1 | 0 | 0 | 0 | 0 | 0 |
| 1 | 1 | 1 | 1 | 1 | 1 | 1 | 1 | 0 | 0 | 0 | 0 | 0 | 0 | 0 |
| 1 | 1 | 1 | 1 | 1 | 1 | 1 | 1 | 0 | 0 | 0 | 0 | 0 | 0 | 0 |
| 1 | 1 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |
| 0 | 0 | 0 | 0 | 0 | 0 | 0 | 0 | 0 | 0 | 0 | 0 | 0 | 0 | 0 |

SKY DETECTION SYSTEM USED IN IMAGE EXTRACTION DEVICE AND METHOD USING SKY DETECTION SYSTEM

BACKGROUND OF THE INVENTION

1. Field of the Invention

The present invention relates to image processing and pattern identification, and specifically to, a sky detection system used in an image collection device and a method using the sky detection system.

2. Description of the Related Art

Up until now, technologies for detecting sky with image collection devices such as cameras and image pickup devices have been developed. For example, Patent Document 1 has disclosed a method for detecting sky in an image. This method includes classifying potential sky pixels based on colors; extracting communicated regions from the potential sky pixels; calculating saturation-degree attenuation gradients of regions excluding those that have a texture above a predetermined threshold; and identifying the regions that have the attenuation gradients matching the predetermined threshold as true sky regions in the image.

Further, Non-Patent Document 1 has disclosed a method for detecting sky based on a physical model. This method includes a classification step based on colors; a region extraction step; and a sky signature identification step based on the physical model.

However, the above calculation methods for detecting sky are complicated and thus cannot be carried out in real time. In addition, these methods are based on only pixel information in images and do not substantially use effective information of an image collection device.

Patent Document 1: U.S. Pat. No. 6,504,951

Non-Patent Document 1: A physical model-based approach to detecting sky in photographic images, Jiebo Luo and Stephen P., IEEE Trans on Image Processing, 2000

SUMMARY OF THE INVENTION

The present invention may provide a calculation method of an image collection device for detecting sky in real time by substantially using pixel information of an image, a distance diagram on the image collection device, directional information of the image, etc.

According to a first aspect of the present invention, there is provided a sky detection system that detects sky in an image collection device. The system includes an image collection unit that collects information of a color image; a color-feature extraction unit that extracts a color feature of each pixel from the collected image; a distance measurement unit that measures a distance between said each pixel of the collected image and a lens; a first classification unit that classifies said each pixel of the collected image as either a sky pixel or a non-sky pixel based on the color feature; and a second classification unit that further classifies said each pixel of the collected image as either the sky pixel or the non-sky pixel based on the distance and a result of the first classification unit.

According to a second aspect of the present invention, there is provided a sky detection method for detecting sky in an image collection device. The method includes an image collection step of collecting information of a dolor image; a color-feature extraction step of extracting a color feature of each pixel from the collected image; a distance measurement step of measuring a distance between said each pixel of the collected image and a lens; a first classification step of classifying said each pixel of the collected image as either a sky pixel or a non-sky pixel based on the color feature; and a second classification step of further classifying said each pixel of the collected image as either the sky pixel or the non-sky pixel based on the distance and a result of the first classification step.

According to embodiments of the present invention, it is possible to provide the calculation method of an image collection device for detecting sky in real time by substantially using pixel information of an image, a distance diagram on the image collection device, directional information of the image, etc.

Other objects, features and advantages of the present invention will become more apparent from the following detailed description when read in conjunction with the accompanying drawings.

BRIEF DESCRIPTION OF THE DRAWINGS

FIG. 4 is a diagram showing a mechanism for calculating a distance between a pixel and a lens;

FIG. 5B shows a distance graph corresponding to the image of FIG. 5A;

FIG. 11 is a diagram of an execution procedure example showing the process of growing a region;

FIGS. 12A and 12B are diagrams showing a region growing result;

DETAILED DESCRIPTION OF THE PREFERRED EMBODIMENTS

Figure 1:
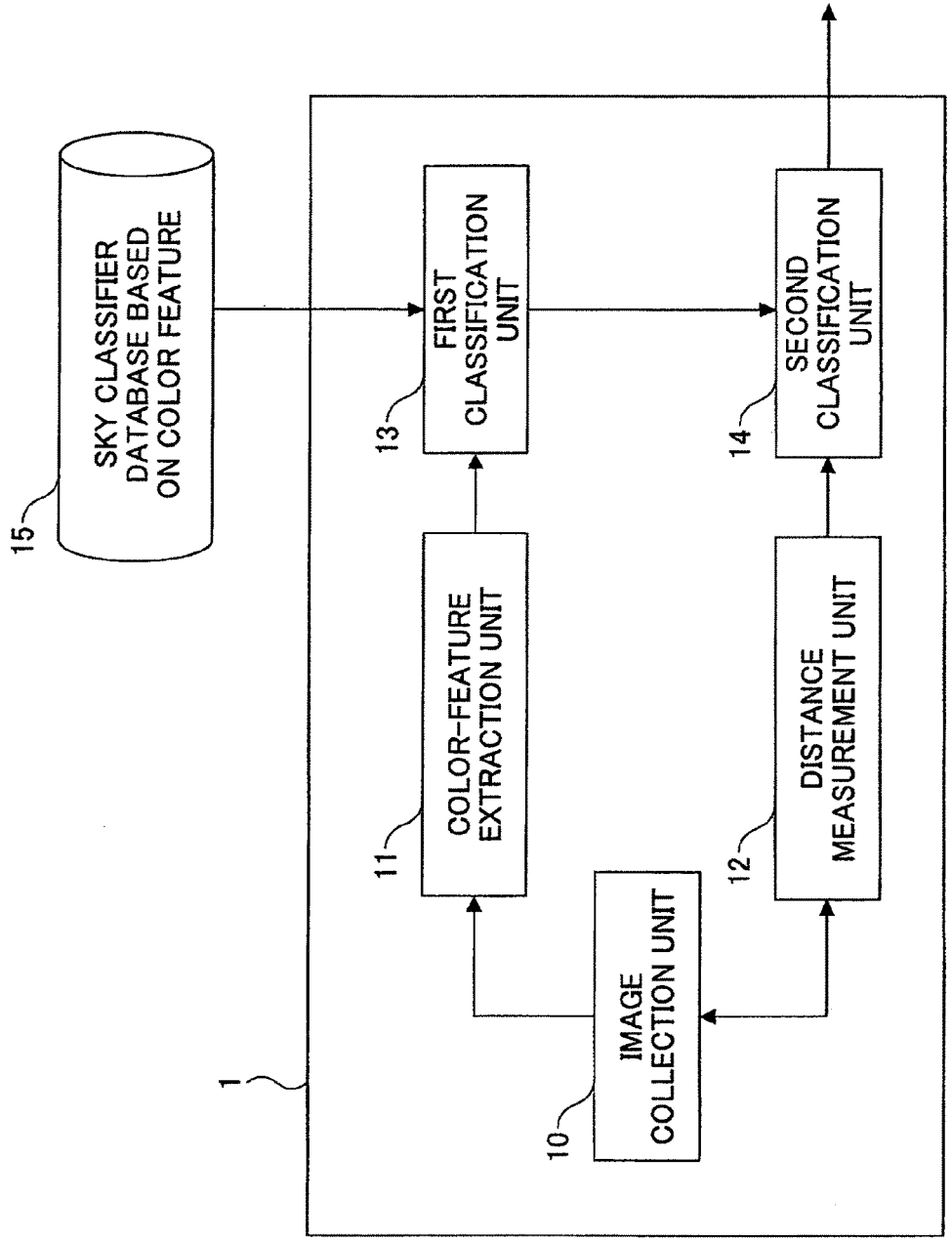
FIG. 1 is a block diagram showing a sky detection system according to a first embodiment of the present invention.

Embodiments of the present invention are specifically described below with reference to the accompanying drawings. In addition, elements or units that implement the same functions are denoted by the same reference numerals in the embodiments.

Further, examples of an image collection device, to which a sky detection system and a method using the sky detection system according to the embodiments of the present invention are applied, include a camera, an image pickup device, etc.

FIG. 1 is a block diagram showing the sky detection system according to a first embodiment of the present invention.

As shown in FIG. 1, the sky detection system 1 according to the first embodiment of the present invention has an image collection unit 10, a color-feature extraction unit 11, a distance measurement unit 12, a first classification unit 13, and a second classification unit 14.

In the sky detection system 1 shown in FIG. 1, the color-feature extraction unit 11 and the distance measurement unit 12 are connected to the image collection unit 10 and receive data from the image collection unit 10. The first classification unit 13 is connected to the color-feature extraction unit 11 and a sky classifier database 15 capable of providing data based on color features, and receives data from the color-feature extraction unit 11 and the sky classifier database 15. In this embodiment, the sky classifier database 15, which provides the first classification unit 13 with sky classifier data based on the color features, is installed outside the sky detection system 1. The second classification unit 14 is connected to the distance measurement unit 12 and the first classification unit 13, and receives data from the distance measurement unit 12 and the first classification unit 13.

The image collection unit 10 collects color image information. The color-feature extraction unit 11 extracts the color feature of each pixel from the collected image. The distance measurement unit 12 measures a distance between each pixel and a lens with respect to the collected image. The first classification unit 13 classifies each pixel of the collected image as either a sky pixel or a non-sky pixel based on the color feature. The second classification unit 14 classifies each pixel of the collected image as either the sky pixel or the non-sky pixel based on a target focal distance and a result of the first classification unit.

The image collection unit 10 collects image data used for the processing of various units described below, and may include, for example, a lens, a shutter, and a CCD for image formation. In the first embodiment, the image collection unit 10 has a L (luminance) channel, a R (red) channel, a G (green) channel, and a B (blue) channel for collecting an image signal required for sky detection. In the sky detection, an image having low resolution is more favorable for real-time processing with the image collection device. In the first embodiment, image data having resolution of 16×16 may be used, and each pixel of the image data corresponds to an image block having a size of 204×153 in a final full image that has seven million pixels.

Figure 2:
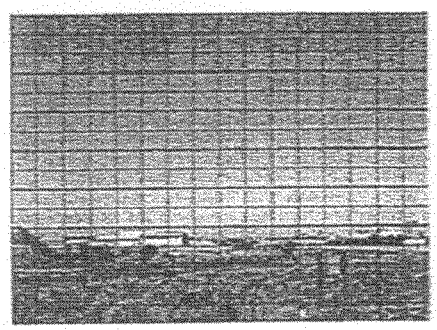
FIG. 2A shows an original image.
FIGS. 2B through 2E show data of four channels corresponding to an image having low resolution.

FIG. 2A shows an original image, and FIGS. 2B through 2E show data of the four channels corresponding to an image having low resolution. In other words, FIG. 2A shows a final full image, and FIGS. 2B through 2E show a 16×16 image signal corresponding to the image shown in FIG. 2A. Each pixel in the image has the L channel data, R channel data, G channel data, and B channel data representing its channel feature value. The 16×16 image signal having low resolution can be obtained in real time from the hardware of the image collection device.

The color-feature extraction unit 11 extracts the color feature of each pixel from a collected image. In the first embodiment, an R channel value, a G channel value, and a B channel value as a three-dimensional color feature vector are used as the color feature of each pixel. The color-feature extraction unit 11 extracts the color data of the R channel, G channel, and B channel for each pixel from the image and identifies the data as color features. The color of sky is generally blue. Therefore, even if the R, G, and B channel values are used as they are, it is possible to distinguish whether or not they refer to the sky.

The distance measurement unit 12 measures a distance between each pixel and the lens of the image collection device with respect to an image formed on a CCD. A specific method for measuring the distance is described below.

The first classification unit 13 classifies each pixel of the collected image as either a pixel that represents sky (hereinafter referred to as a sky pixel) or a pixel that does not represent the sky (hereinafter referred to as a non-sky pixel) based on a color feature extracted by the color-feature extraction unit 11 and sky classifier data provided by the sky classifier database 15 (a method for forming the sky classifier data is described later).

The second classification unit 14 receives a processing result of the first classification unit 13 and a measurement result of the distance measurement unit 12, and further classifies the pixels as either the sky pixel or the non-sky pixel.

As described above, the first classification unit 13 classifies each pixel of the collected image as either the sky pixel or the non-sky pixel based on the sky classifier data of the color feature. In the present invention, the sky classifier is constructed by a support vector machine of a linear kernel function.

Prior to the shipment of the image collection device having the sky detection system to which the embodiment of the present invention is applied, it is necessary to perform specific training on the sky classifier, calculate and acquire the sky classifier data, and install the acquired sky classifier data into the first classification unit 13 in advance.

The classifier used in the first classification unit 13 is obtained by the training with respect to a predetermined amount of annotated sky pixels and non-sky pixels. In other words, when performing the training on the sky classifier, the sky pixels and the non-sky pixels manually annotated with respect to a sample image are identified as positive samples and negative samples, respectively. Then, a feature vector $f_i$ is extracted for each pixel. For example, after the annotation of n positive samples and m negative samples, the equation k=n+m is established. Accordingly, a feature vector set F={$f_i$}, i=1 ... k, and a code set Y={$y_i$}, i=1 ... k are obtained. Here, $y_i$ is an identification code corresponding to $f_i$ and defined as follows.

$$y_i = \begin{cases} 1, & f_i \text{ is a positive sample} \\ 0, & f_i \text{ is a negative sample} \end{cases}$$

It is necessary to select an appropriate kernel function to perform the training. In the first embodiment, the following linear kernel function that does not require complicated calculation is selected.

$$K(x_i, x_j) = x_i \cdot x_j$$

In the process of the training, the feature vector set V={$v_i$}, i=1 ... nv is selected from the feature vector set F based on the algorithm of the training. In addition, a weight $a_j$ corresponding to each feature vector vi is calculated based on the algorithm.

Then, in a prediction process, the following classification function is used.

$$fun(v) = \sum_{i=1}^{nv} y_i a_i * K(v_i, v) + b$$

where $y_i$ is a sample code corresponding to $v_i$, and b is a constant calculated based on the algorithm of the training.

When the linear kernel function is used, the classification function is rewritten as follows.

$$fun(v) = \sum_{i=1}^{nv} y_i * a_i * K(v_i, v) + b$$
$$= \sum_{i=1}^{nv} y_i * a_i * (v_i \cdot v) + b$$
$$= \sum_{i=1}^{nv} ((y_i * a_i * v_i) \cdot v) + b$$
$$= (\sum_{i=1}^{nv} y_i * a_i * v_i) \cdot v + b$$
$$= w \cdot v + b$$

where the time required for the prediction process can be reduced if w is calculated before the prediction process.

Thus, w and b can be obtained as the sky classifier data corresponding to a specific image collection device. The sky classifier data w and b are stored in advance in the first classification unit 13 of the image collection device or in a specific memory (not shown) which is electrically connected to the first classification unit 13 and whose data can be accessed by the first classification unit 13 so as to be provided when the image collection device performs the sky detection.

The identification code corresponding to an input feature vector v (feature vector obtained by the image collection device at the time of picking up an image, e.g., the above color feature or the like) can be predicted based on the following method.

$$y_v = \begin{cases} 1, & fun(v) \geq 0 \\ 0, & fun(v) < 0 \end{cases}$$

The first classification unit 13 classifies a pixel to which the classification code $y_v = 1$ is added as a sky pixel and a pixel to which $y_i = 0$ is added as a non-sky pixel.

Not only the above calculation method, but also other calculation methods used in another embodiment of the present invention such as a K-neighborhood method (K-NN) and Adaboost may be used for performing the training on the sky classifier. Since these training methods refer to the related arts, their descriptions are omitted here.

Next, the configuration and operations of the distance measurement unit 12 are described.

Figure 3:
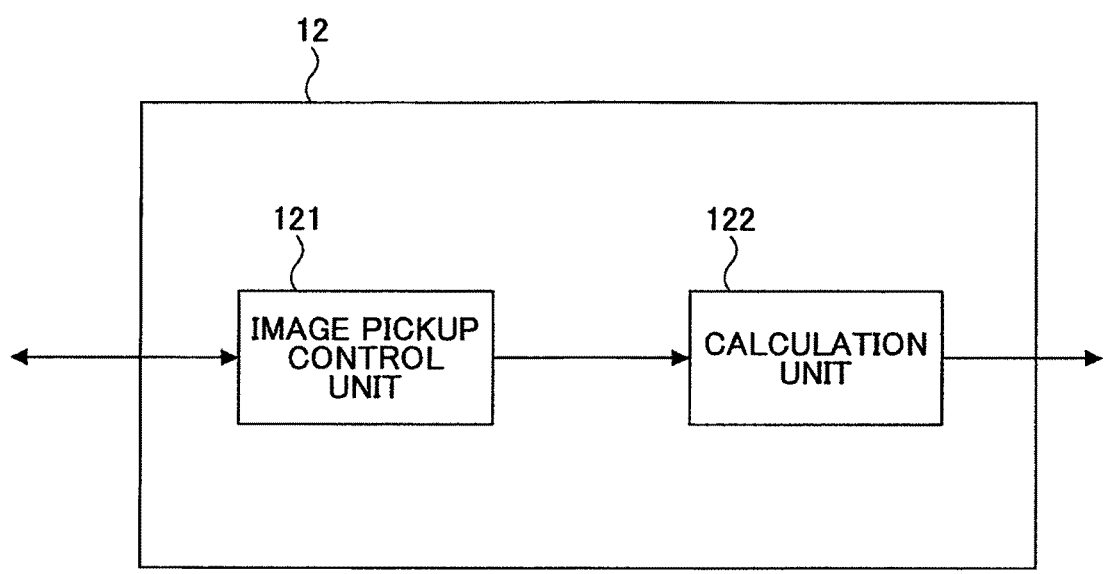
FIG. 3 is a block diagram showing the configuration of a distance measurement unit according to the first embodiment of the present invention.

FIG. 3 is a block diagram showing the configuration of the distance measurement unit 12 according to the first embodiment of the present invention.

The distance measurement unit 12 measures a distance between a pixel of an image and the lens of the image collection device. As shown in FIG. 3, the distance measurement unit 12 has an image pickup control unit 121 and a calculation unit 122. According to the first embodiment of the present invention, at the time of focusing prior to image pickup by the image collection device, the image pickup control unit 121 controls the image collection unit 10 such that it picks up plural images at different focal distances and outputs the picked-up images to the calculation unit 122. The calculation unit 122 calculates contrasts at different focal distances for each pixel and acquires the focal distance corresponding to the maximum one of the plural contrasts, thereby obtaining the distance between the pixel and the lens. Thus, according to the first embodiment of the present invention, the focal distance corresponding to the maximum one of the plural contrasts can be used for obtaining the distance between the pixel and the lens.

FIG. 4 is a diagram showing a mechanism for calculating a distance between a pixel and a lens according to the first embodiment of the present invention.

As shown in FIG. 4, plural images (on the left side) are picked up at different focal distances under the control of the image pickup control unit 121. Each of the images has a predetermined number of pixels such as pixels A and B. Further, a coordinate graph on the right side of FIG. 4 shows a state where the contrasts of the pixel picked up at the different focal distances change as the focal distance changes. In the coordinate graph, a curved line a' indicates a relationship between the contrasts of the pixel A and the focal distance, and a curved line b' indicates a relationship between the contrasts of the pixel B and the focal distance. A value "a" on a horizontal axis corresponding to the highest contrast of the curved line a' refers to a distance between the pixel A and the lens. A value "b" on the horizontal axis corresponding to the highest contrast of the curved line b' refers to a distance between the pixel B and the lens.

The contrast of a pixel in an image is the sum of absolute values of a pixel value difference between the pixel and a neighboring pixel. As to a pixel I(x, y), four neighboring pixels are defined as I(x−1, y), I(x+1, y), I(x, y−1), and I(x, y+1). Therefore, the contrast of the pixel is found by the following formula.

$$\text{Contrast}(x, y) = \sum_{\substack{m=-1,1 \\ n=-1,1}} abs(I(x+m, y+n) - I(x, y))$$

A subject corresponding to the pixel of an image does not show the maximum contrast in the contrast curved line of the pixel if there is any pixel far away from the lens of the image collection device. In this case, the distance between the pixel and the lens is set to be infinite.

With the above method, the distance measurement unit 12 acquires the distance between all the pixels of a picked-up image and the lens to form a distance graph.

Figure 5A:
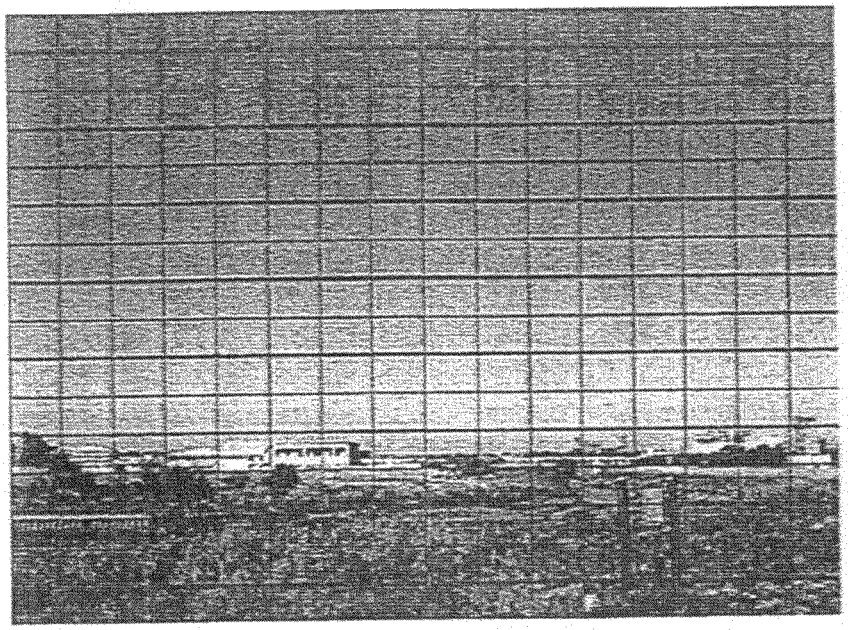
FIG. 5A shows an example of an image.

FIGS. 5A and 5B are a picked-up image and a distance graph corresponding to the image, respectively.

FIG. 5A shows an example of the image, and FIG. 5B shows the distance graph corresponding to the image of FIG. 5A calculated by the distance measurement unit 12 using the above method. "INF" in the distance graph represents infinity.

Further, the applicable scope of the first embodiment of the present invention is not limited by the above method for calculating a distance and a distance graph. Persons skilled in the art can calculate the distance between a pixel and the lens by using any method according to related arts.

Figure 6:
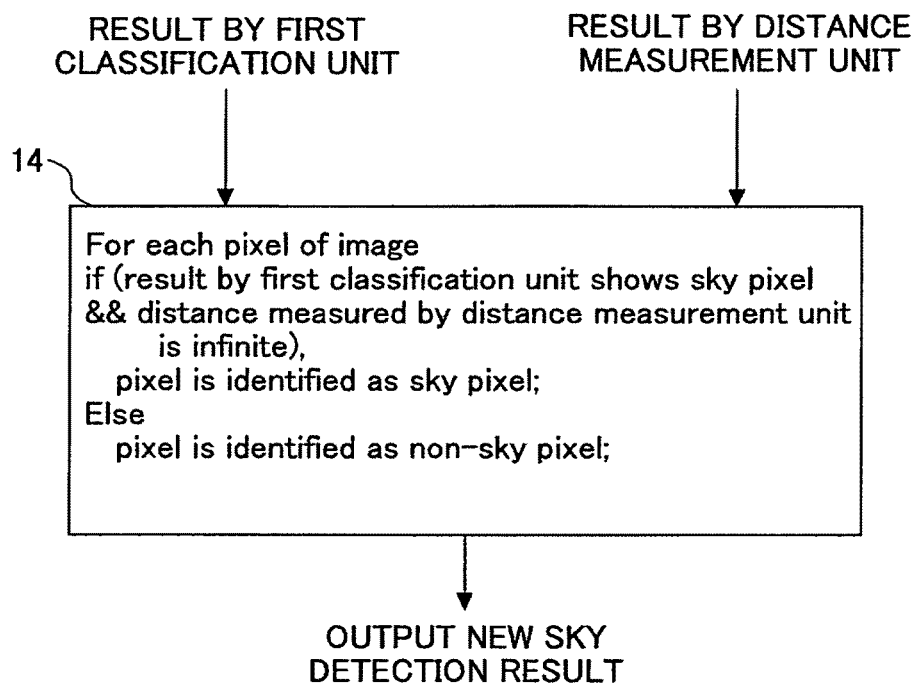
FIG. 6 is a diagram for explaining the operations of a second classification unit according to the first embodiment of the present invention.

FIG. 6 is a diagram for explaining the operations of the second classification unit 14 according to the first embodiment of the present invention.

As shown in FIG. 6, the second classification unit 14 receives a classification result of the first classification unit 13 and data of a distance graph about an image formed by the distance measurement unit 12 and makes the following determination for each pixel. In other words, a pixel, which is classified as a sky pixel by the first classification unit 13 and determined to have an infinite distance to a lens by the distance measurement unit 12, is classified as a sky pixel. On the other hand, a pixel classified as a non-sky pixel by the first classification unit 13 or a pixel classified as a sky pixel but determined not to have an infinite distance to the lens (determined to have a constant value) by the distance measurement unit 12 is classified as a non-sky pixel. Then, based on a new sky detection result obtained by the second classification unit 14, an image formation unit (not shown) or the like of the image collection device forms the final image of a picked-up image.

Figure 7:
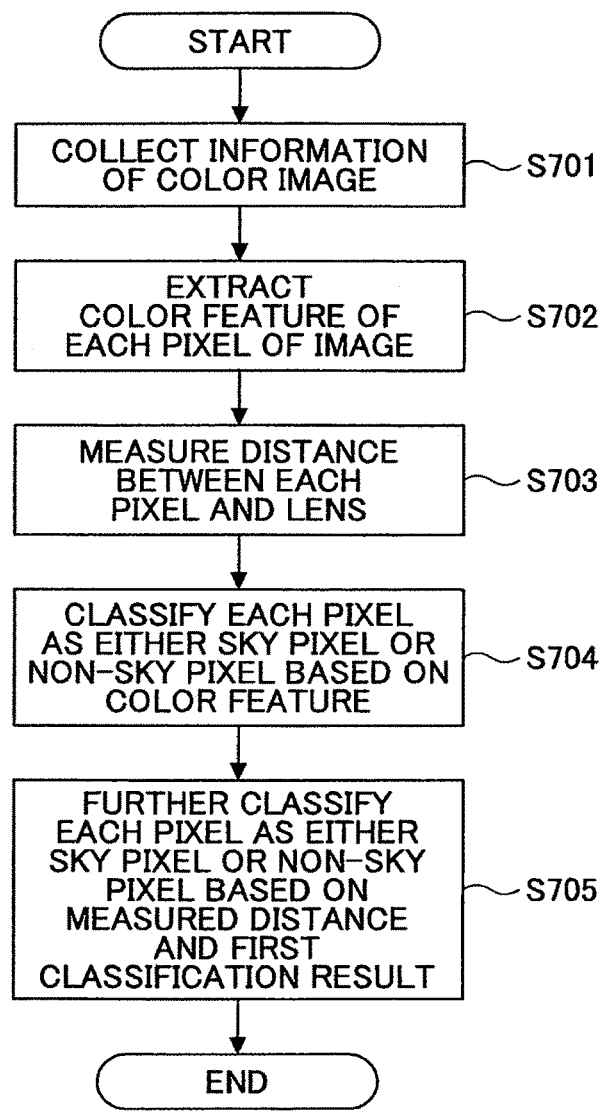
FIG. 7 is a flowchart showing a sky detection method according to the first embodiment of the present invention.

FIG. 7 is a flowchart showing a sky detection method according to the first embodiment of the present invention.

As shown in FIG. 7, color image information is first collected in step S701. Next, in step S702, the color feature of each pixel is extracted from the collected image. Then, in step S703, a distance between each pixel and a lens is calculated with respect to the collected image. Next, in step S704, each pixel is classified as either a sky pixel or a non-sky pixel (by the first classification unit 13) based on the color feature. Then, in step S705, each pixel is further classified as either a sky pixel or a non-sky-pixel based on the measured distance between the pixel and the lens and a classification result of the first classification unit 13.

Note that the configuration of the first embodiment of the present invention is not limited by the order of implementing the above steps. As is clear from another embodiment of the present invention, the above steps can be implemented by any other order, separately, or simultaneously.

Further, as the first embodiment of the present invention, step S701 is implemented by the image collection unit 10 shown in FIG. 1, step S702 is implemented by the color-feature extraction unit 11 shown in FIG. 1, step S703 is implemented by the distance measurement unit 12 shown in FIG. 1, step S704 is implemented by the first classification unit 13 shown in FIG. 1, and step S705 is implemented, by the second classification unit 14 shown in FIG. 1.

Figure 8:
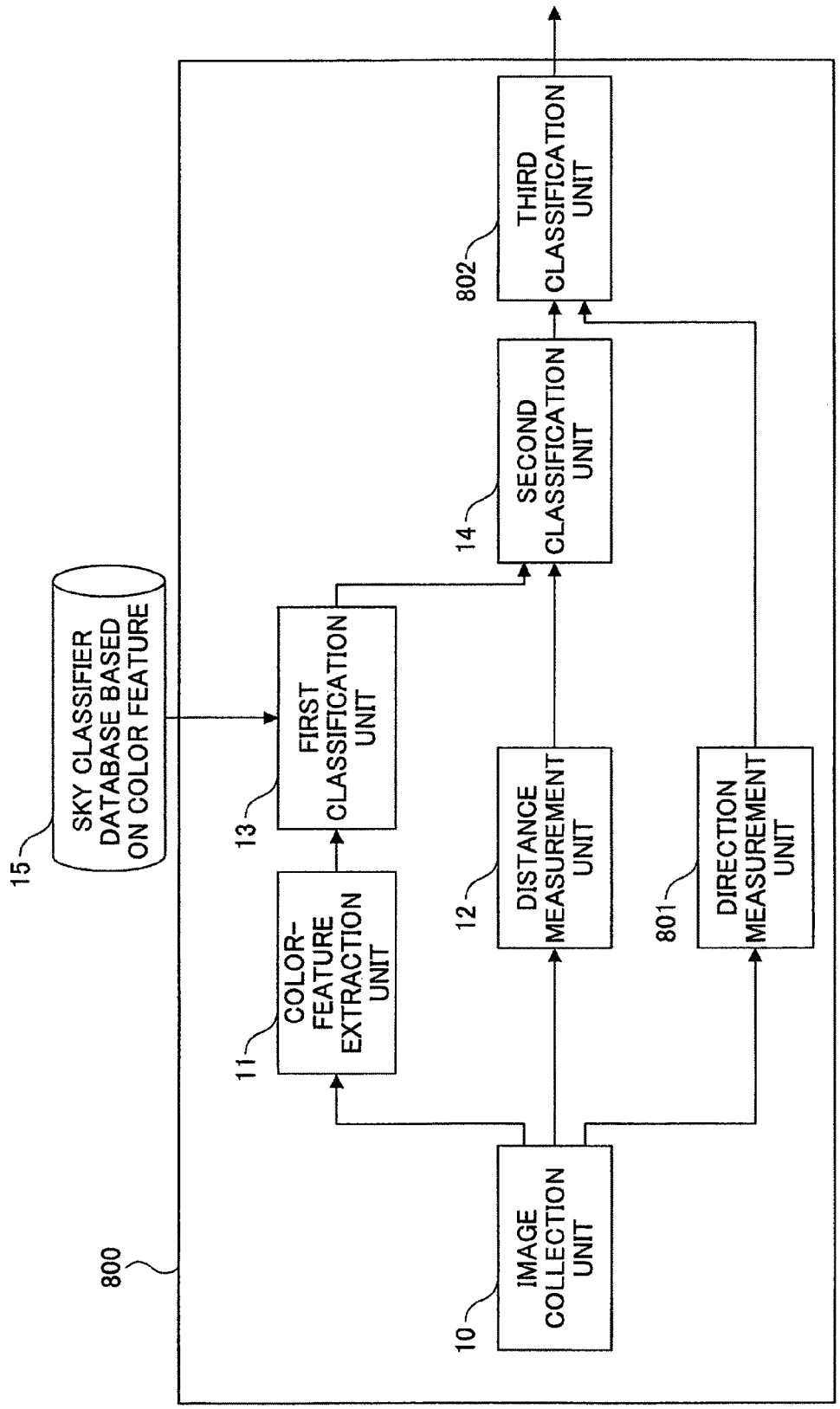
FIG. 8 is a block diagram showing a sky detection system of an image collection device according to a second embodiment of the present invention.

FIG. 8 is a block diagram showing a sky detection system of an image collection device according to a second embodiment of the present invention.

As shown in FIG. 8, the sky detection system 800 of the image collection device according to the second embodiment of the present invention is different from the sky detection system 1 according to the first embodiment of the present invention in that it has a direction measurement unit 801 and a third classification unit 802. Note that since configurations, operations, and functions of the image collection unit 10, the color-feature extraction unit 11, the distance measurement unit 12, the first classification unit 13, and the second classification unit 14 are the same as those of the sky detection system 1 according to the first embodiment, their descriptions are omitted.

In the second embodiment of the present invention, the direction measurement unit 801 is connected to the image collection unit 10. Further, the third classification unit 802 is connected to the direction measurement unit 801 and the second classification unit 14, receives data from the direction measurement unit 801 and the second classification unit 14, and outputs the received data outside the sky detection system 800. Here, the second classification unit 14 does not directly output the data outside the sky detection system 800.

According to the second embodiment of the present invention, the direction measurement unit 801 measures directional information of a collected image. The third classification unit 802 further classifies each pixel of the collected image as either a sky pixel or a non-sky pixel based on results by the direction measurement unit 802 and the second classification unit 14.

The direction measurement unit 801 can measure image information in upward, downward, leftward, and rightward directions. In other words, an image has information in upward, downward, leftward, and rightward directions. However, the second embodiment of the present invention is not limited by this, and the direction measurement unit 801 can measure image information in any direction other than the above directions.

Figure 9:
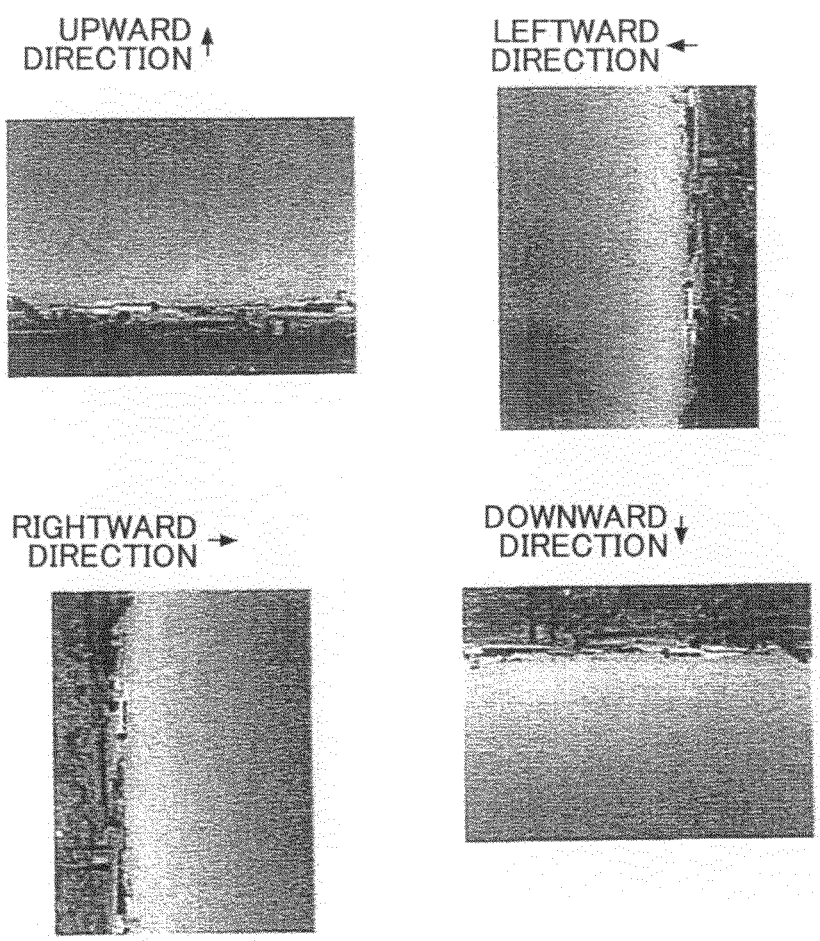
FIG. 9 shows four images in different directions.

FIG. 9 shows four images in different directions.

As shown in FIG. 9, the "upward" direction image has sky on its upper side, the "leftward" direction image has the sky on its left side, the "rightward" direction image has the sky on its right side, and the "downward" direction image has the sky on its lower side.

Figure 10:
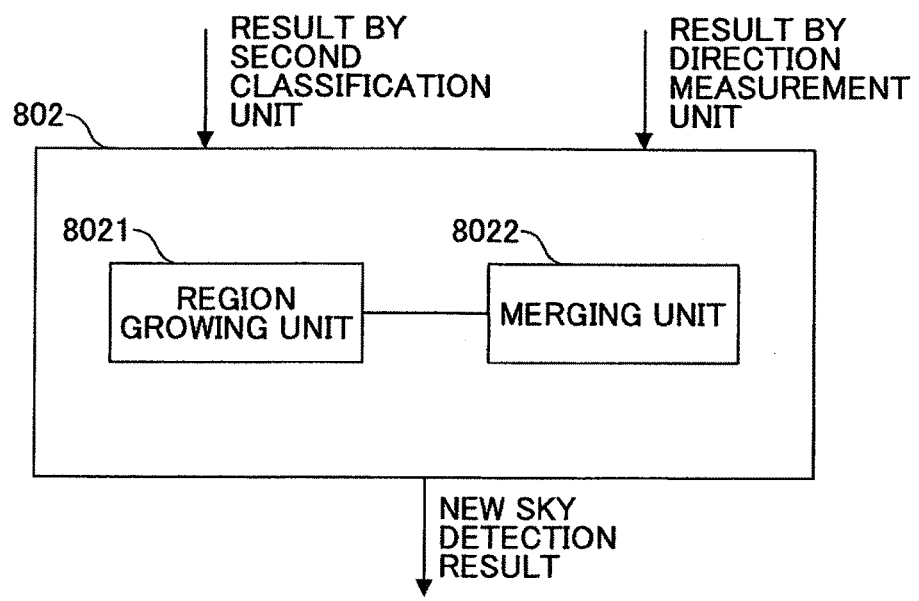
FIG. 10 is a block diagram showing the configuration of a third classification unit according to the second embodiment of the present invention.

FIG. 10 is a block diagram showing the configuration of the third classification unit 802 according to the second embodiment of the present invention.

As shown in FIG. 10, the third classification unit 802 has a region growing unit 8021 and a merging unit 8022 connected to the region growing unit 8021. The region growing unit 8021 grows a region based on a classification result of the second classification unit 14 and generates a candidate region for a sky region. Further, the merging unit 8022 determines directional information and identifies all the pixels in the candidate region as sky pixels if the candidate region has upper pixels in an image. Otherwise, the merging unit 8022 identifies all the pixels in the candidate region as pixels in a non-sky region.

Specifically, the region growing unit 8021 receives a classification result of the second classification unit, grows a region based on the classification result 14, and connects neighboring pixels having a similar color to each other so as to form a candidate region for a sky region. The merging unit 8022 receives the candidate region output from the region growing unit 8021 and a measurement result of the direction measurement unit 801 and makes the following determination. In other words, the merging unit 8022 identifies all the pixels in the candidate region as sky pixels if the candidate region has upper pixels in an image. Otherwise, the merging unit 8022 identifies all the pixels in the candidate region as pixels in a non-sky region. Therefore, the upper pixels in the "leftward" direction are the leftmost pixels in the image, the upper pixels in the "upward" direction are the uppermost pixels in the image, the upper pixels in the "rightward" direction are the rightmost pixels in the image, and the upper pixels in the "downward" direction are the lowermost pixels in the image.

Moreover, the third classification unit 802 outputs a new sky detection result outside the sky detection system 800 to perform further processing. For example, the third classification unit 802 outputs a new sky detection result to an image collection device such as an image forming unit (not shown). Then, the image forming unit forms a final image of a picked-up image based on the output new sky detection result.

FIG. 11 is a diagram of an execution procedure example showing the process of growing a region.

As shown in FIG. 11, in steps S1 through S8, a region symbol matrix M corresponding to an image signal, e.g., a 16×16 matrix is first formed. All the elements constituting the matrix M correspond to respective pixels of an image. The values of the elements of the matrix M are set to 0 by initialization. Then, a matrix B corresponding to the image signal is formed, and the values of the elements of the matrix B are set to 0 or 1 by initialization based on a classification result of the second classification unit 14. Further, one code count variable C is set to 0 by initialization. In the process of growing a region, each element (x, y) of the matrix M is successively processed. Where M(x, y) is 0, the value of M (x, y) is defined as a current code C and the element (x, y) is defined as a seed element. If the seed element grows to a neighboring pixel and two neighboring pixels $(x_0, Y_0)$ and $(x_0, y_0)$ meet the following condition, these two pixels are connected to each other.

When the element starts with the seed element (x, y) and completes its growth, pixels having the same classification result of the second classification unit 14 among the neighboring pixels of the seed element (x, y) are connected to each other, and the same numerical value is assigned to the region code M(x, y). Then, when the region code is assigned to all the elements of the matrix M, the current image region is divided into $C_n$ regions ($C_n$ is the final value of the code count variable C).

FIGS. 12A and 12B are diagrams showing a region growing result.

When the output result matrix B by the second classification unit 14 is the one shown in FIG. 12A, the region symbol matrix M output through the region growth as shown in FIG. 12B is obtained. Here, $C_n$ is equal to 2, the first region in a gray region is $C_0$, and the second region in a white region is $C_1$.

Figure 13:
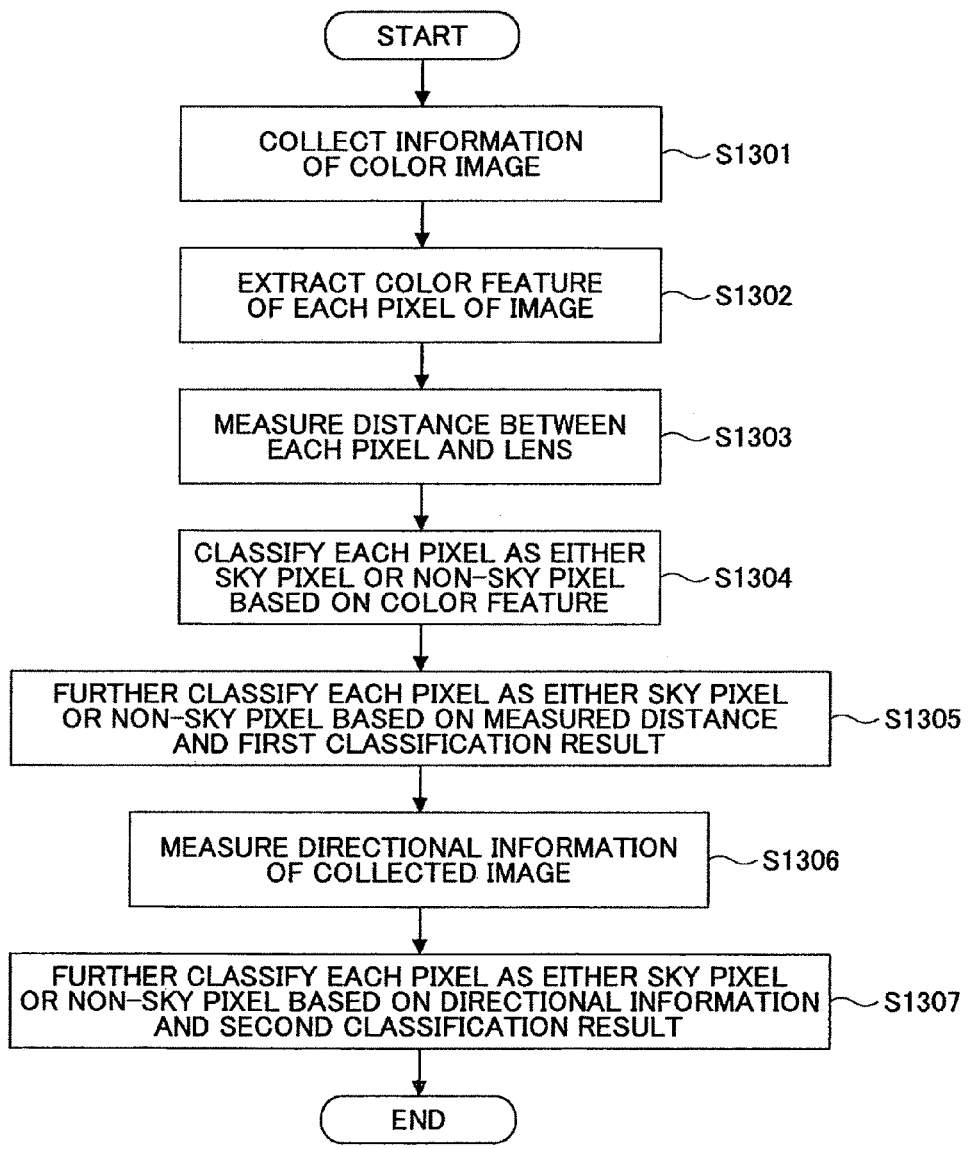
FIG. 13 is a flowchart showing a sky detection method according to the second embodiment of the present invention.

FIG. 13 is a flowchart showing a sky detection method according to the second embodiment of the present invention.

As shown in FIG. 13, color image information is collected in step S1301. Next, in step S1302, the color feature of each pixel is extracted from the collected image. Then, in step S1303, a distance between each pixel and a lens is calculated with respect to the collected image. Next, in step S1304, each pixel is classified as either a sky pixel or a non-sky pixel based on the color feature. Then, in step S1305, each pixel is further classified as either a sky pixel or a non-sky pixel based on the measured distance between the pixel and the lens and a classification result of the first classification unit 13. Moreover, in step S1306, directional information of the collected image is measured. Finally, in step S1307, each pixel is further classified as either a sky pixel or a non-sky pixel with respect to the collected image based on the classification result in step S1305 and the directional information measured in step S1306.

Note that the configuration of the second embodiment of the present invention is not limited by the order of implementing the above steps. As is clear from another embodiment of the present invention, the above steps can be implemented by any other order, separately, or simultaneously.

Further, as the second embodiment of the present invention, step S1301 is implemented by the image collection unit 10 shown in FIG. 8, step S1302 is implemented by the color-feature extraction unit 11 shown in FIG. 8, step S1303 is implemented by the distance measurement unit 12 shown in FIG. 8, step S1304 is implemented by the first classification unit 13 shown in FIG. 8, step S1305 is implemented by the second classification unit 14 shown in FIG. 8, step S1306 is implemented by the direction measurement unit 801 shown in FIG. 8, and step S1307 is implemented by the third classification unit 802 shown in FIG. 8.

Figure 14:
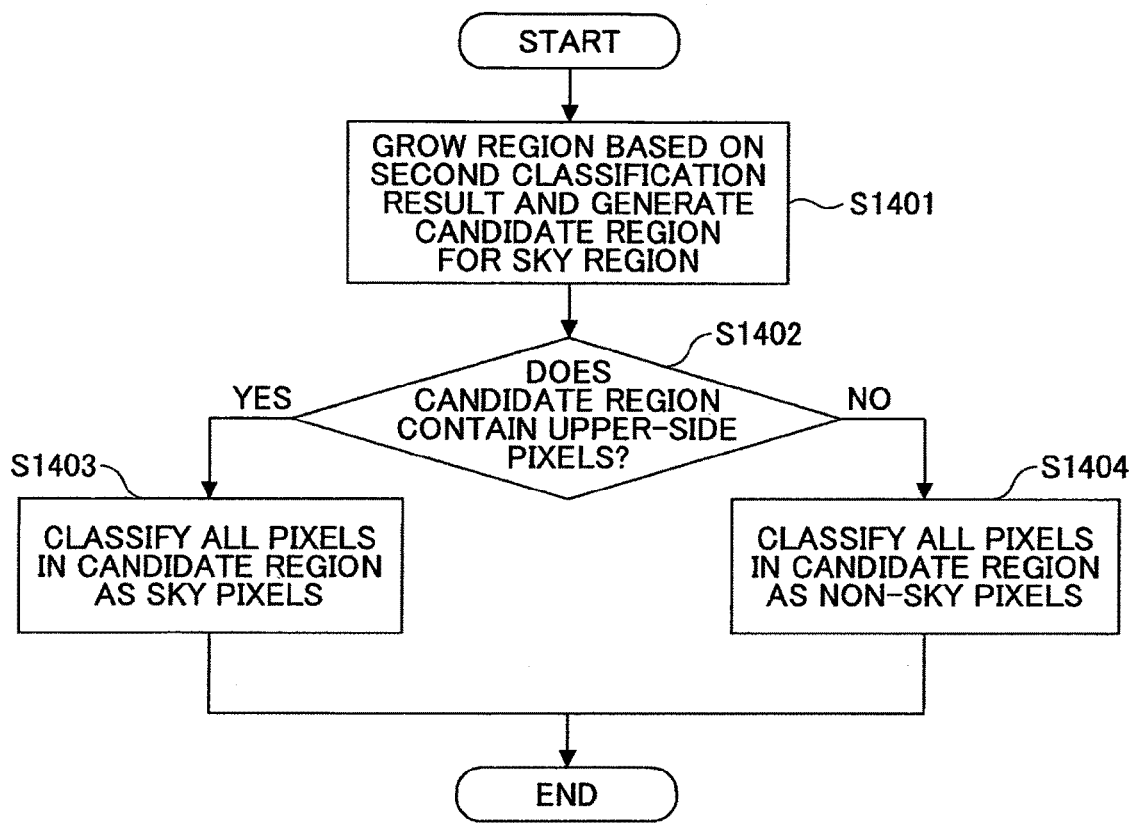
FIG. 14 is a flowchart showing the operations procedure of the third classification unit according to the second embodiment of the present invention.

FIG. 14 is a flowchart showing further processing in step S1307.

As shown in FIG. 14, in step S1401, a region is grown based on a classification result output in step S1305, and a candidate region for a sky region is generated. Next, in step S1402, it is determined whether the candidate region contains upper-side pixels in an image based on directional information of the image output in step S1306. The processing proceeds to step S1403 if a determination result in step S1402 is "Yes" and proceeds to step S1404 if the result is "No". Then, in step S1403, all the pixels in the candidate region are classified as sky pixels. On the other hand, in step S1404, all the pixels in the candidate region are classified as non-sky pixels.

Note that the configuration of the second embodiment of the present invention is not limited by the order of implementing the above steps. As is clear from another embodiment of the present invention, the above steps can, be implemented by any other order, separately, or simultaneously.

Further, as the second embodiment of the present invention, step S1401 is implemented by the region growing unit 8201 shown in FIG. 10, and step S1402 is implemented by the merging unit 8202 shown in FIG. 10.

Note that the above embodiments of the present invention are implemented by hardware, software, firmware, or combination thereof. However, the configuration scope of the embodiments of the present invention is not limited by them. Further, the configuration of the embodiments of the present invention is not limited by the connection relationship between the respective function units or elements. One or plural of the function units or elements can include or be connected to another function unit or element.

Alternatively, the above embodiments of the present invention can be applied to the fields of sky detection, automatic white balance adjustment, etc., of an image collection device.

The present invention is not limited to the specifically disclosed embodiments, and variations and modifications may be made without departing from the scope of the present invention.

The present application is based on Chinese Priority Application No. 200910147779.9 filed on Jun. 19, 2009, the entire contents of which are hereby incorporated herein by reference.

What is claimed is:

1. A sky detection system that detects sky in an image collection device, the system comprising:
   an image collection unit that collects information of a color image;
   a color-feature extraction unit that extracts a color feature of each pixel from the collected image;
   a distance measurement unit that measures a distance between said each pixel of the collected image and a lens;
   a first classification unit that classifies said each pixel of the collected image as either a sky pixel or a non-sky pixel based on the color feature; and
   a second classification unit that further classifies said each pixel of the collected image as either the sky pixel or the non-sky pixel based on the distance and a result of the first classification unit.

2. The sky detection system according to claim 1, wherein the image collection unit has a L channel, a R channel, a G channel, and a B channel for collecting an image signal.

3. The sky detection system according to claim 1, wherein the color-feature extraction unit extracts, from the image, color data of an R channel, a G channel, and a B channel for said each pixel and identifies the extracted color data as the color feature.

4. The sky detection system according to claim 1, wherein the distance measurement unit comprises:
   an image pickup control unit that performs control to pick up an image at different focal distances; and
   a calculation unit that calculates plural contrasts of said each pixel of the image at the different focal distances and finds the focal distance corresponding to the maximum one of the calculated plural contrasts to thereby set the focal distance as the distance between the pixel and the lens.

5. The sky detection system according to claim 1, wherein a classifier used in a first classification unit is obtained by training with respect to a predetermined amount of annotated sky pixels and non-sky pixels.

6. The sky detection system according to claim 1, wherein among all the pixels of the image,
the pixel, which is classified as the sky pixel by the first classification unit and has an infinite value of the distance measured by the distance measurement unit, is further classified as the sky pixel, and
the pixel, which is classified as the non-sky pixel by the first classification unit and has a finite value of the distance measured by the distance measurement unit, is further classified as the non-sky pixel.

7. The sky detection system according to claim 1, further comprising:
a direction measurement unit that measures directional information of the collected image; and
a third classification unit that classifies said each pixel of the collected image as either the sky pixel or the non-sky pixel based on a result of the direction measurement unit and a result of the second classification unit.

8. The sky detection system according to claim 7, wherein the directional information of the image contains upward information, downward information, leftward information, and rightward information.

9. The sky detection system according to claim 7, wherein the third classification unit comprises:
a region growing unit that grows a region based on the result of the second classification unit to generate a candidate region for a sky region; and
a merging unit that determines all the pixels in the candidate region as the sky pixels if the candidate region contains upper-side pixels in the image and determines all the pixels in the candidate region as the non-sky pixels if the candidate region does not contain the upper-side pixels in the image based on the directional information.

10. A sky detection method for detecting sky in an image collection device, the method comprising:
an image collection step of collecting information of a color image;
a color-feature extraction step of extracting a color feature of each pixel from the collected image;
a distance measurement step of measuring a distance between said each pixel of the collected image and a lens;
a first classification step of classifying said each pixel of the collected image as either a sky pixel or a non-sky pixel based on the color feature; and
a second classification step of further classifying said each pixel of the collected image as either the sky pixel or the non-sky pixel based on the distance and a result of the first classification step.

11. The sky detection method according to claim 10, further comprising:
a direction measurement step of measuring directional information of the collected image; and
a third classification step of classifying said each pixel of the collected image as either the sky pixel or the non-sky pixel based on a result of the direction measurement step and a result of the second classification step.

12. The sky detection method according to claim 11, wherein
the third classification step comprises:
a region growing step of growing a region based on the result of the second classification step to generate a candidate region for a sky region; and
a merging step of determining all the pixels in the candidate region as the sky pixels if the candidate region contains upper-side pixels in the image and determines all the pixels in the candidate region as the non-sky pixels if the candidate region does not contain the upper-side pixels in the image based on the directional information.

* * * * *